United States Patent
Aahlad et al.

(10) Patent No.: US 11,829,327 B2
(45) Date of Patent: *Nov. 28, 2023

(54) METHODS, DEVICES AND SYSTEMS FOR MIGRATING AN ACTIVE FILESYSTEM

(71) Applicant: WANdisco Inc., San Ramon, CA (US)

(72) Inventors: Yeturu Aahlad, Foster City, CA (US); Ramakrishna Thurimella, Centennial, CO (US); Christopher Mackey, Ballygowan (GB)

(73) Assignee: CIRATA, INC., San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/884,916

(22) Filed: Aug. 10, 2022

(65) Prior Publication Data

US 2023/0021417 A1    Jan. 26, 2023

Related U.S. Application Data

(63) Continuation of application No. 16/898,328, filed on Jun. 10, 2020, now Pat. No. 11,487,703.

(51) Int. Cl.
*G06F 16/11* (2019.01)
*G06F 16/178* (2019.01)
*G06F 16/185* (2019.01)

(52) U.S. Cl.
CPC .......... *G06F 16/119* (2019.01); *G06F 16/178* (2019.01); *G06F 16/185* (2019.01)

(58) Field of Classification Search
CPC ..... G06F 16/119; G06F 16/178; G06F 16/185
See application file for complete search history.

(56) References Cited

U.S. PATENT DOCUMENTS

2005/0193245 A1    9/2005   Hayden et al.
2005/0273486 A1*   12/2005  Keith, Jr. ............ H04L 67/1095
                                                    709/200

(Continued)

OTHER PUBLICATIONS

AU Office Action dated Jan. 6, 2023 in AU patent application No. 2021290111 (3 pages).

(Continued)

*Primary Examiner* — Cam Y T Truong
(74) *Attorney, Agent, or Firm* — YOUNG LAW FIRM, P.C.

(57) ABSTRACT

A computer-implemented method of migrating metadata from a donor filesystem D having a rooted tree structure to a beneficiary filesystem B while processing commands that operate on the metadata may comprise, while a command to operate on the metadata is not received, replicating the donor filesystem D at the beneficiary filesystem B by sequentially copying metadata of nodes of the donor filesystem D to the beneficiary filesystem B. When a command is received to operate on the metadata, the command may be executed at both the donor filesystem D and the beneficiary filesystem B when all arguments of the command are present in both the donor filesystem D and the beneficiary filesystem B. When none of arguments are present in the beneficiary filesystem B, the command may be executed at the donor filesystem D only. When only some of the arguments are present in the beneficiary filesystem B, the command may be enqueued at least until all arguments of the command are present in the beneficiary filesystem B. When all arguments thereof are present in the beneficiary filesystem B, the enqueued commands may be dequeued and scheduled for execution.

23 Claims, 6 Drawing Sheets

(56) References Cited

U.S. PATENT DOCUMENTS

2007/0061487 A1     3/2007   Moore et al.
2008/0235300 A1     9/2008   Nemoto et al.
2019/0332579 A1*   10/2019   Cooper ............... G06F 21/6218

OTHER PUBLICATIONS

CA Office Action dated Feb. 1, 2023 in CA Application 3,184,896 (4 pages).

* cited by examiner

```
MIGRATE ACTIVE FILESYSTEM
Input: Donor filesystem D, empty filesystem B
Output: B made identical to D
node n = root of D
command c = client command to operate on D
args[] = argument array of c
Q = min heap to hold the blocked commands with the rightmost
argument of each command as the key to the heap
concurrently execute:
    Scanner
       1. while( n not null )
             a. copy n to B,
                notify Q
             b. n = getNext( D )
       2. signal done to Proxy                                    ~ 2002

Client Proxy
       1. if ( all args are available in B )
                execute c at both D & B
          else if ( none of the args are in B )
                execute c at D only
          else
                //block c until all args are at B
                enqueue( Q, c )
       2. while (all args of peek(Q) are not available
          in B)
                wait
       3. dequeue(Q) & schedule for execution
       4. if ( scanner done ) deque all commands from Q
          & execute                                               ~ 2004
```

*FIG. 2*

METHODS, DEVICES AND SYSTEMS FOR MIGRATING AN ACTIVE FILESYSTEM

BACKGROUND

Today, so-called Big Data has found a natural home in the cloud. In the cloud, leading companies are taking full advantage of cheap, scalable storage and the flexibility that comes from powerful cloud analytic platforms. However, even though there are compelling advantages to migrating big data to the cloud, there are latent business risks.

One approach to migrating Big Data to the cloud is by doing it manually. Manual migration is a custom, tactical approach to copying big data. When administrators manually migrate data, they create, manage, schedule and maintain custom or open-source scripts to migrate the large data sets. When a data transfer device is added to the big data to cloud migration plan, there is additional custom scripting required to upload the data. The business risks with this manual approach to big data cloud migration include data inconsistency, business disruption, and high IT resource requirements.

Risk of Data Inconsistency

Large data sets take time to migrate to the cloud. 1 petabyte (PB) at 1 giga bits per second (Gbps) takes approximately 100 days to migrate. Even with a data transfer device, vendor load time takes weeks. While making data available in the cloud, change and ingest is still needed. Changing data during the lengthy migration time adds risk to bringing large scale data sets accurately to the cloud. With manual migration relying on custom or open-source scripts that focus on copying data, however, it may be impracticable for the migration team to validate the accuracy of the migration. Indeed, manual reconciliation at scale does not guarantee a completely consistent data outcome. Also, this approach does not support new updates that are likely to occur during the migration process. Typically, changes to data that are modified or created during migration are not supported by manual approaches to large-scale data migration.

Risk of Business Disruption

Organizations have deployed increasingly mission-critical workloads to Hadoop because of scale and fit benefits. Enterprise-critical workloads bring with them expectations of availability, consistency, security, and auditability. On the spectrum of complexity, moving non-changing datasets is simple, while moving dynamically-changing datasets with these expectations is very challenging. Manual migration often requires meaningful disruption of on-premises applications operations during big data migration. Administrators who choose incremental migration strategies that bring data sets to the cloud over many months face handling disruptive updates and incur the risk of not meeting their enterprise Service Level Agreements (SLAs).

Risk of High IT Resources Requirements and Increased Cost

The significant capital investments companies made to build out data centers to host their Hadoop data and workloads have just now moved past the typical two to four-year depreciation period, allowing those costs to be written off. Shifting from capital hardware depreciation to operational expenditure for cloud becomes straightforward. Companies also have significant investments in people, processes, and applications supporting the on-premises data infrastructure. Adding manual migration to these sunk costs is a risk to the IT budget. The overhead of activities to attempt non-disruptive, no-downtime big data migration are significant. The extent of resources required to create, test, manage, schedule and maintain custom migration scripts may not be fully appreciated or even quantifiable at the outset of the data migration project. Due to the custom nature of manual migrations, such migration programs are prone to costly delays.

BRIEF DESCRIPTION OF THE DRAWINGS

FIG. 2 is a diagram that illustrates aspects of one embodiment of the present computer-implemented methods and systems.

DETAILED DESCRIPTION

Figure 1A:
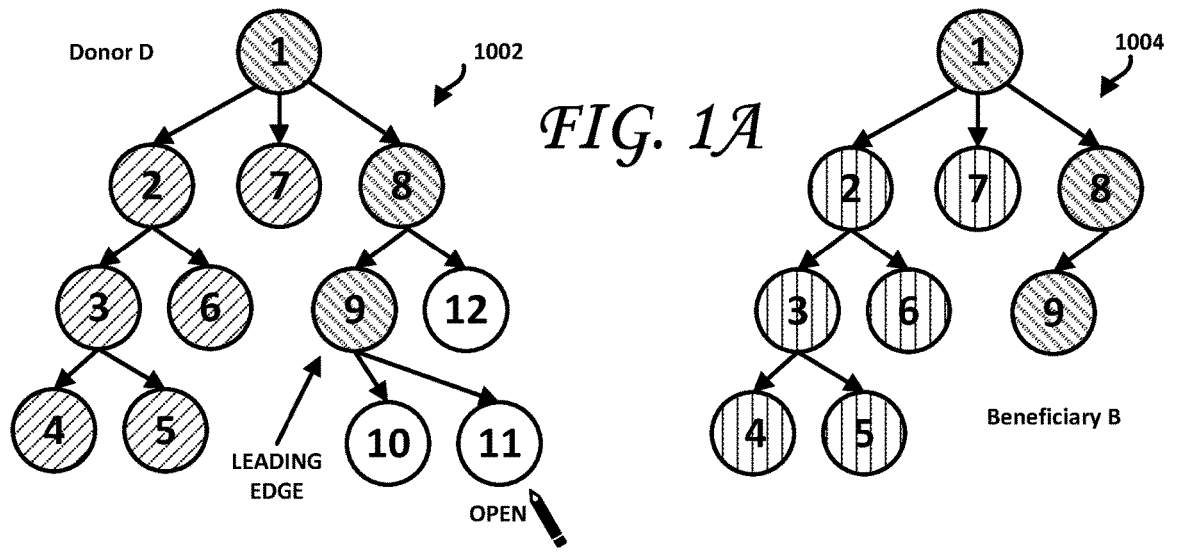
FIG. 1A is an illustration of a rooted tree structure of a donor D and of a beneficiary B.

Consider copying large amounts of data from a filesystem (referred to as the donor), such as the Hadoop Filesystem (HDFS), to a destination such as cloud storage (the beneficiary). Once the data is migrated, a "cut over" to the destination can be performed by simply abandoning the donor, or both replicas can be maintained by keeping them in sync using an active-active replication solution. Tools for such active-active replication can be built using a distributed consensus protocol, e.g. Paxos Fusion from the present assignee WANdisco, Inc.

As noted earlier, transferring large datasets (e.g., a petabyte or more), even over fast communication channels, takes a long time. Therefore, it is entirely conceivable that the act of migrating large amounts of data could take a prohibitive amount of time—longer than the owner of that data can avoid having to modify it. For example, such a migration could take days or months depending on the amount of data and the available bandwidth and the owner of that data might not have the option of not modifying the data during that period. A key business requirement, therefore, is the ability to allow client operations to execute on the donor filesystem while the migration is underway. Herein, a migration that allows client operations during the migration process is denoted as a non-disruptive migration. Such non-disruptive migrations are, by their very nature, long running, meaning that the migration may take days, weeks or months to complete. Given the long running nature of such non-disruptive migrations, another business requirement is that any such long running operation must also be made sufficiently robust as to withstand failures such as failures of nodes and links.

Currently, petabyte-scale migration is performed by first transferring the data to a storage transfer appliance, e.g. an AWS Import/Export Snowball, physically shipping it to the cloud vendor, and waiting until that data is uploaded to the cloud storage—a process that can take upwards of one week. Significantly, the data is inaccessible until it is uploaded. However, the data loaded into the storage appliance would have most certainly undergone changes during this period, but for the migration to cloud storage. These changes (deltas) can be captured by taking a snapshot and sending it over the wire. This process is iterated until both sites have identical content. It may be necessary to lock the filesystem and block the clients when the last delta needed to correct the content is small enough and it is deemed that the disruption to the customers from such blocking is not significant. Note that depending on the vendor, there are upper limits on the data transfer rate to the storage appliance. If the transfer rate becomes a limiting factor, it is expected that the system administrator will partition the filesystem and makes use of multiple appliances in parallel. There is also no guarantee on how long this method takes before the data on both sides becomes identical. There are bound to be manual steps with this style of migration. Unless there are strong consistency checks, this method is prone to data loss/corruption.

What are needed, therefore, are robust methods and systems for eliminating the risk or high cost of manual Big Data migration. What are also needed are methods and systems for automated data migration at scale across all major commercial Hadoop distributions to cloud with a single scan of the source storage, even while data continues to change. Such a solution should require no scripts, no code maintenance, no transfer devices, no scheduling, no reviewing.

One embodiment, therefore, enables the automation of data migration to the cloud, at scale, from continuously operating on-premises systems. As changes occur anywhere in the donor system (where the data is migrating from), the present methods and systems for live migration ensure that the beneficiary system (where the data is migrating to) has consistent data on completion. Additionally, the present computer-implemented methods and systems operate to minimize IT resources with one click replication from a single scan of the source storage across all major commercial (e.g., Hadoop) distributions and cloud storage and analytic services. The described live migration computer-implemented methods and systems include an automated approach to big data migration that provides validation of data consistency between the shared systems. As changes can occur anywhere in the donor system, the beneficiary has consistent data on completion, with no data loss and no uncertainty about the accuracy of the migration. In so doing, the described live migration methods and systems offer 100% business continuity for hybrid, multi-region and cloud environments with the continued operation of on-premises clusters. With no impact to donor cluster and operations during migration, the described live migration methods and systems enable companies to meet their critical SLAs in a timely and cost-effective manner.

Herein, the data to be migrated is assumed to be structured in the form of a rooted tree, where internal nodes of the tree are directories and the leaves represent files or empty directories. Those of skill in this art may recognize that this is an abstraction of a real filesystem that ignores symbolic links, limitations on directory and file sizes, ownership permissions, etc. and that different implementation details would address these issues. Nevertheless, such an abstraction is useful here. During migration, the data to be migrated is assumed to change. That is, throughout the present disclosure, it is assumed that the clients of the filesystem continue to issue commands c to the donor D to modify the data to be migrated, being migrated or having been migrated. Though the migrator process M according to embodiments is configured with the ability to block commands c being applied to donor D, such blocking should only be carried out when it is unavoidable and in such a manner as to minimize disruption. The present migrator process M may selectively apply the changes to beneficiary B requested by commands c, with the goal of making beneficiary B identical to the donor D after all changes from c have been applied to the donor D and the donor D is quiesced. Once metadata (including, without limitation, the bidirectional link between the node being migrated and its parent, permissions, last access time and other attributes of a file or a folder) has been migrated, the task of duplicating the corresponding actual data blocks is relegated to another tool, e.g. Fusion. The beneficiary B is assumed to be initially empty. If not, the beneficiary B may decide, after consulting the metadata received from donor D, whether it is necessary to pull the content.

One embodiment, therefore, is an asynchronous migration computer-implemented method M that is configured such that after the last operation or command c has been applied to the donor D and D quiesced, the beneficiary B receives all the changes and becomes identical to D. A naïve implementation, therefore, may include:

1. Block all commands c;
2. Copy all of the data from donor D to beneficiary B; and
3. Unblock the blocked command queue.

While correct, such an implementation is not optimal, as it does not minimize disruption while migrating the filesystem. Consider a depth-first scan (DFS) traversal of a rooted tree 1002, such as shown in FIG. 1A. DFS starts at the root, denoted in FIG. 1A as Node 1. After visiting a node, DFS recursively scans all its descendants starting at the lexicographically first child. After the subtree rooted at the first child has been scanned, DFS moves on to the second child and so on until all the nodes are visited. In FIG. 1A, DFS scans from left to right, starting at the lexicographically first child; in this case, Node 1. After Node 1, Node 2 is scanned, followed by Node 3. As Node 3 has two descendants, (Nodes 4 and 5), they are scanned before the other descendant of Node 2; namely Node 6. After Node 3 and its descendants 4 and 5 are scanned, Node 2's lexicographically next child, Node 6, is scanned. At this stage, Node 2 and all of its descendants have been scanned. Again going from left to right, Node 7 is then scanned, which node has no descendants. Node 8 and its descendants are then scanned. So Node 9 is scanned after Node 8. As Node 9 has two descendants (Nodes 10 and 11), they will be scanned before Node 8's other child (Node 12) is scanned. As Nodes 10 and 11 have yet to be scanned, Node 9 is the leading edge and the last node scanned. As nodes 2 and 7 and all descendants thereof on the donor D side have already been scanned, those nodes and all of their respective descendants have been replicated (at least the metadata thereof), as suggested by the vertical hashing on the beneficiary B side. As Node 8's descendants have not all been traversed yet, and as Node 9 is the current leading edge of the DFS traversal, Node 8 and its branches and descendants are not indicated to have been replicated (at least the metadata thereof) on the beneficiary B side. The node numbering scheme in this DFS traversal, therefore, indicates the direction and order of travel. When a node is said to be available or present at the beneficiary B, the metadata corresponding to that node and that of all its descendants has been successfully written to the filesystem at B. In FIG. 1A, only nodes with vertical hashing are available at B; nodes numbered 1 and 8-12 are not. Note that DFS in which children are explored recursively in alphabetical order results in visiting each path of the filesystem in a lexicographic order. Therefore, the nodes can be ordered using the "<" (less-than) operation. With that, the notion of smaller and bigger in relation to the node being scanned can be used without any confusion. Also, the notion of "to the left" and "to the right" in relation to the node being scanned can also be used without any confusion.

Also, while a DFS is illustrated herein, embodiments are not limited thereby. Indeed, any scan that visits each node at least once (preferably, exactly once) can be used such as, for example, breadth-first. Whatever the chosen order by the scanner at the donor is, the beneficiary must be cognizant of that order so that it can handle the client operations correctly. According to one embodiment, upon receiving a request to pull content of a node, the beneficiary acknowledges the request after successfully writing the metadata at the target filesystem. In this manner, the donor and the beneficiary work in concert with each other in migrating the metadata. In one embodiment, actual task of transferring content is delegated to a separate module, which may execute after migrating the metadata. Let the leading edge refer to the last node fetched by the Iterator 2012 (FIG. 3) from the donor filesystem. Similarly, let the trailing edge refer to the smallest (or leftmost) node for which the scanner issued a request, but the beneficiary has not acknowledged the successful writing of the metadata corresponding to that node. From the donor's point of view, all nodes smaller than the trailing edge, therefore, are in the migrated portion. The nodes between the leading and trailing edges constitute the migrating portion of the filesystem. This set of nodes can be envisioned, according to one embodiment, as a sliding window that grows and shrinks as the donor issues requests and receives acknowledgements from the beneficiary. In a scenario in which the iterator fetches a single object using getNext( ) 2016 from the donor filesystem, issues a request to the remote agent, waits for a confirmation before issuing the next request, the size of the sliding window would never get bigger than one. This approach may be too limiting in many cases. Instead of reaching out to the disk for every object, one implementation envisions the iterator fetching several objects at a time and keeping them in main memory whenever the sliding window is empty. However, it may be preferable for the sliding window to never be allowed to grow too large. Otherwise, the bounded resources at the donor or at the beneficiary may become overwhelmed, which may lead to a potential crash. In most practical implementations, therefore, it would be prudent to have a large, bounded window in accordance with the resources available for migration. With this understanding, it can be assumed that getNext( ) 2016 represents fetching a collection of objects to be migrated, though the description is framed in terms of getting one object at a time from the disk for clarity.

Figure 1B:
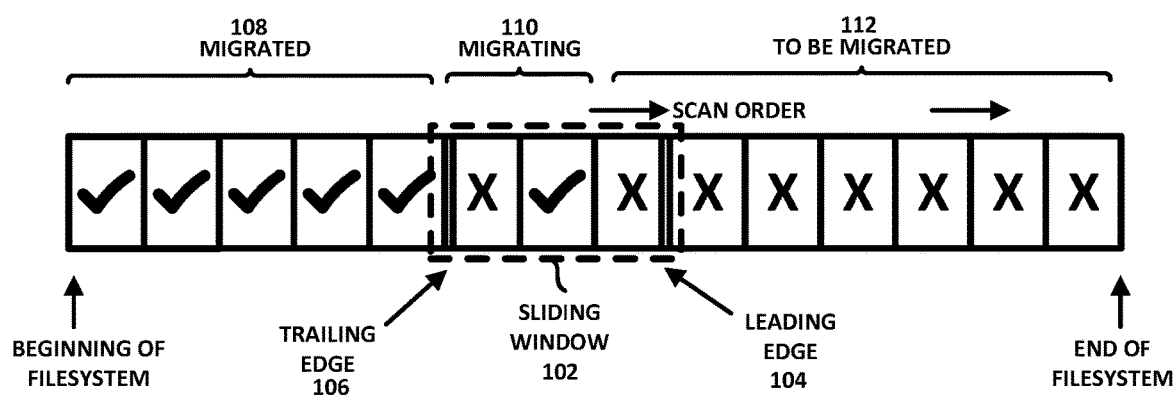
FIG. 1B is an illustration showing a sliding window of content pulled from a group of nodes bounded by a leading and a trailing edge, according to one embodiment.

FIG. 1B is an illustration showing a sliding window of content pulled from a node, bounded by a leading and a trailing edge, according to one embodiment. As shown, the sliding window 102 is shown bounded by A leading edge 104, which is the last node fetched by the Iterator 2012 from the donor filesystem D. Similarly, reference numeral 106 denotes the trailing edge, the smallest (or leftmost) node for which the scanner issued a request, but the beneficiary filesystem B has not acknowledged the successful writing of the metadata corresponding to that node. From the donor D's point of view, all nodes smaller than the trailing edge (check marked nodes), therefore, are in the migrated portion 108. As shown in FIG. 1B, the nodes between the leading edge 104 and the trailing edge 106 constitutes the migrating portion 110 of the filesystem. In the example of FIG. 1B, the leading edge is not the same as the trailing edge, as the iterator 2012 is fetching more than one node at a time. The nodes not yet fetched by the Iterator 202 from the donor filesystem D are shown at 112, as to-be-migrated and currently unmigrated nodes 112. As shown in FIG. 1B, the migrating nodes 110 as shown as being captured by a sliding window 102 that grows (encompasses a greater number of nodes) and shrinks (encompasses a lesser number of nodes) as the donor filesystem D issues requests and receives acknowledgements from the beneficiary filesystem B.

FIG. 2 shows aspects of a computer-implemented method of migrating an active filesystem, according to one embodiment. As shown therein, the computer-implemented process takes a donor filesystem D and an empty beneficiary filesystem B as inputs and returns a beneficiary filesystem B that has been made, at least with respect to the metadata of the data stored in donor filesystem D, identical to the donor filesystem D. As shown in FIG. 2, the root of donor filesystem D is denoted as node "n". As also shown, commands issued by a client to operate on the data in donor filesystem D are denoted as "c" and args[ ] is an argument array of such commands c. In FIG. 2, Q is a min heap that is configured to hold blocked commands c, with the rightmost argument of each command c as the key to the min heap.

As shown in FIG. 2, one embodiment comprises a scanner 2002 and a client proxy or migrator 2004, which are interposed between the client that issues the commands c and the donor filesystem D. In this manner, all commands c issued by the client are intercepted by the client proxy or migrator 2004, which decides how and when to implement the requested changes (e.g., write, append, truncate, move, delete, rename, etc.) encoded in the commands c received from the client. On the beneficiary filesystem B side, a migrator remote agent receives a data object O to be copied from the scanner 2002, writes the metadata of such data object O to the beneficiary filesystem B and reports back to the scanner 2002 the successful or unsuccessful writing of the metadata of data object O to the beneficiary filesystem B.

The scanner 2002, according to one embodiment, may be configured to scan through each node of the donor filesystem D, copy that node's metadata to the beneficiary filesystem B, notify the min heap Q that the current node's metadata has been copied to the beneficiary filesystem B, and repeat the process with the next node until the entire filesystem tree of the donor filesystem D has been traversed (in a single traversal, in one embodiment), whereupon the scanner 2002 may signal completion of the migration to the client proxy or migrator 2004.

The migrator 2004, in conjunction with the scanner 2002, may be configured to migrate metadata from a donor filesystem D to a beneficiary filesystem B as the filesystem at the donor filesystem D is undergoing changes; that is, as commands operate on and change the data (and consequently the metadata also) at the donor filesystem D. As such, the donor filesystem D, even as it is being migrated to the beneficiary filesystem B, is an active filesystem. The goal is to reach a point where the beneficiary filesystem B is identical to the donor filesystem D. Note again that the present disclosure is concerned with moving the metadata corresponding to the data blocks stored by the donor filesystem D, and not the data blocks themselves. One possible method of moving the actual data blocks is described and shown in commonly assigned U.S. patent application Ser. No. 15/457,837 filed on Mar. 13, 2017 and entitled "Methods, Devices and Systems for Maintaining Consistency of Metadata and Data across Data Centers", which is incorporated herein in its entirety. Other methods may be used.

The client proxy or migrator 2004 may be configured, according to one embodiment, to receive commands c and to selectively allow execution of or block the execution of such received commands c, depending on the current state of the migration. For example, if a command c received by the migrator 2004 operates both on data block X that is only present in the donor filesystem D and on data block Y that is present in both the donor filesystem D and the beneficiary filesystem B, one embodiment may be configured to block execution of such a command until at least the metadata for both data blocks X and Y are present in the beneficiary filesystem B. This is because the migrator 2004 has already reached the node of the beneficiary filesystem B referencing data block Y and migrated the metadata of data block Y (otherwise the metadata of data block Y would not be present in the beneficiary filesystem B) while it may not have reached the node containing or referencing data block X yet. If changes to the metadata of data block Y were to be allowed through execution of such a command c, such changes could result in different changes being made in the donor filesystem D and in the beneficiary filesystem B, which is not allowed.

As shown in FIG. 2, the migrator or client proxy may be configured to selectively execute incoming commands c depending upon whether the arguments thereof are all present in beneficiary filesystem B, some of the arguments thereof are present in the beneficiary filesystem B or none of the arguments thereof are present in the beneficiary filesystem B. Therefore, as shown at 1. in the migrator 2004, if all arguments of the command c are present in both the donor filesystem D and in the beneficiary filesystem B, the command c may be executed in both the donor and beneficiary filesystems, with the confidence that the metadata of the arguments (data blocks) of the command c will remain identical at both the donor filesystem D and the beneficiary filesystem B. As shown in the first "else" statement, if none of the arguments of command c are present in B, the command may be safely executed, but only at the donor filesystem D. This is because the scanner has not reached one or more of the nodes referencing one or more of the arguments of command c. After execution of the command c, the scanner will eventually reach the node or nodes referencing the data blocks of the arguments of command c and will cause the migration of the changed metadata of the involved node(s) to the beneficiary filesystem B. As noted in the second "else" statement in FIG. 2, if only some of the arguments of command c are present in the beneficiary filesystem B (meaning that some of the arguments of the command c are not present in the beneficiary filesystem B), the command c may be enqueued in the min heap Q until at least such time as all of the arguments thereof are present in the beneficiary filesystems B, whereupon the command may be dequeued and scheduled for execution at both the donor filesystem D and the beneficiary filesystem B, as shown at 3. If the scanner 2002 reports that it has traversed the entire donor filesystem D, any remaining commands c present in the min heap Q may be dequeued and executed or scheduled for execution.

Figure 3:
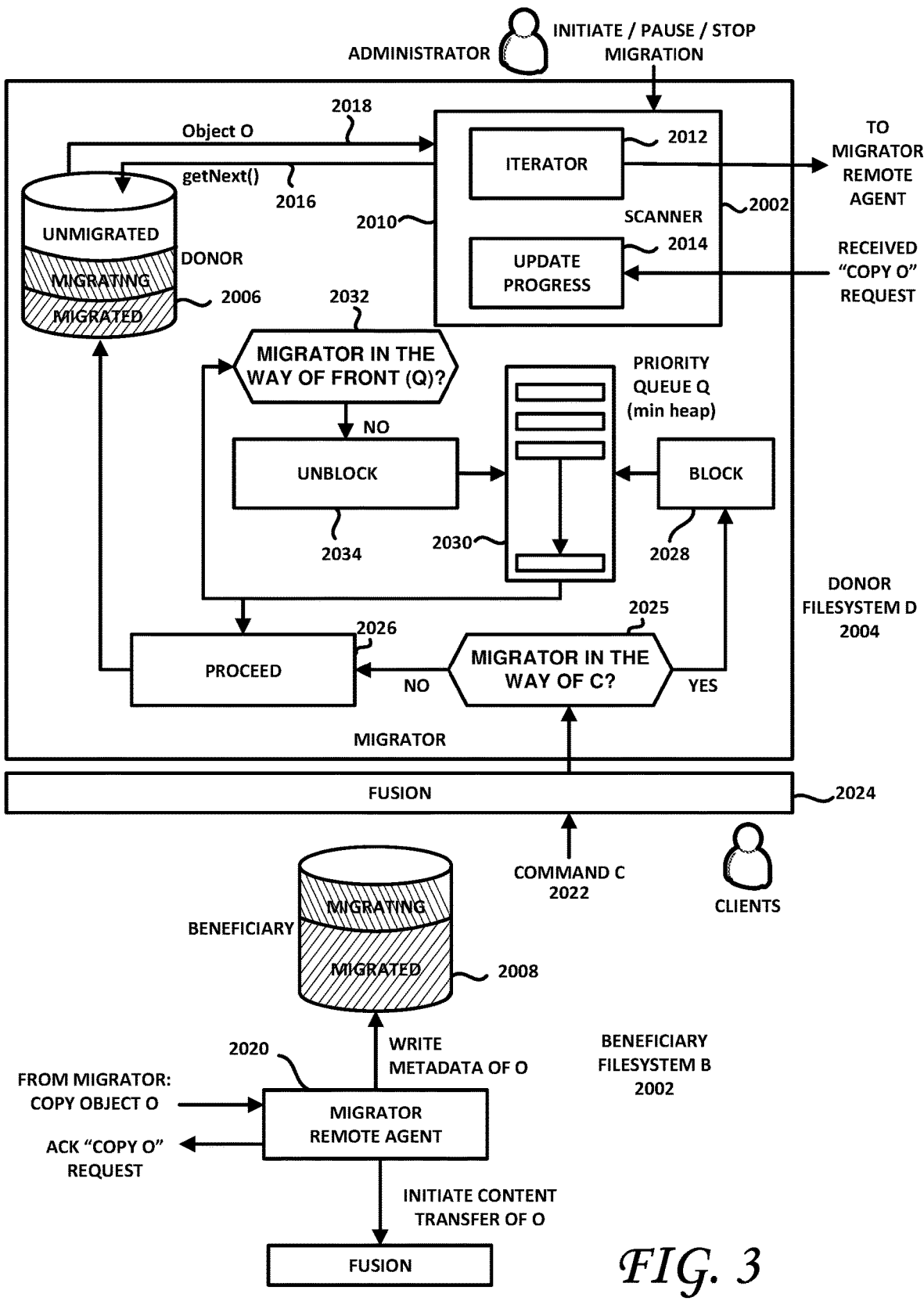
FIG. 3 is a block diagram that illustrates further aspects of the present computer-implemented methods and systems.

FIG. 3 is a block diagram illustrating additional features of a computer-implemented method of migrating an active filesystem, according to one embodiment. FIG. 3 shows aspects of the present computer-implemented method of migrating an active filesystem occurring at the donor filesystem D toward the top of the figure as well as at the beneficiary filesystem B toward the bottom of the figure. The data repository at the donor side D is denoted by reference number 2006 and the data repository at the beneficiary side B is denoted by reference number 2008. According to one embodiment, the data repositories 2006 and 2008 are made to be identical at the end of one pass-through by the scanner 2010 while allowing execution of commands c. After the single pass through, the two repositories are maintained identical as the arguments of any command c will all be present in the beneficiary filesystem B and, therefore, command c may be executed at both the donor filesystem D and the beneficiary filesystem B without compromising metadata and data synchronization. Since FIG. 3 is shown in the state in which the metadata migration is in progress, both the data repository 2006 and the data repository 2008 are shown comprising data and metadata that is currently being migrated from the data repository 2006 to the data repository 2008, as well as data and metadata that has already been migrated from the data repository 2006 to the data repository 2008. As the beneficiary filesystem B is assumed to be empty at the start of the migration, only the data repository 2006 serving the donor filesystem D comprises unmigrated data and metadata.

In FIG. 3, the scanner 2010 may comprise an Iterator module 2012 and an Update Progress module 2014. The iterator module 2012 may be configured to step through the filesystem tree in, for example, DFS fashion, scanning each node of the donor filesystem once, in turn. As shown, the Iterator module 2012 may issue a getNext( ) command 2016, to access the next or the first, as the case may be, node of the donor filesystem D, represented in FIG. 3 by data repository 2006. If this is the first node accessed, the entire data repository 2006 may be tagged as "Unmigrated". Responsive to the getNext( ) command, a first or next data object O may be retrieved from the data repository 2006, as suggested at 2018. Object O (at least the metadata thereof) may then be sent to the migrator remote agent 2020 at the beneficiary side. Upon receipt of the metadata of the data object O from the scanner 2010, the migrator remote agent 2020 may copy the metadata of the data object O to the data repository 2008 at the beneficiary side, with the metadata being in the "Migrating" portions thereof during the writing process and in the "Migrated" portion thereof after the copying and acknowledging the successful transfer is complete. Of course, the "Migrating" and "Migrated" portions of the data repository 2008 need not be physical or logical partitions of the data repository 2008. Indeed, the metadata may be associated with a "Migrating" identifier or tag until such time as the copying is finished and the donor is made aware of this fact, after which a "Migrated" identifier or tag may be associated therewith. Other methods may be used.

Once the metadata of data object O has been copied to the data repository 2008 at the beneficiary side, the migrator remote agent 2020 may notify the scanner 2010 of that fact, which may cause the Update Progress module 2014 to update the position of the scanner 2010 in the donor filesystem node traversal and allow the iterator to issue another getNext( ) command to continue the DFS traversal and copying of at least the metadata of the data objects stored in the data repository 2006 at the donor side to the data repository 2008 at the beneficiary side.

The above works for the static case in which no commands c are issued during the migration from donor to beneficiary. When, however, clients issue commands c that change data objects and/or the metadata thereof during the migration process, as shown in FIG. 3 at 2022, additional functionality comes into play to ensure the orderly migration of metadata from the donor filesystem to the beneficiary filesystem according to one embodiment. As shown in FIG. 3, when a command c 2022 is issued by a client through the data copying layer 2024 (in one implementation, the present assignee's Fusion, as noted above), it may first be determined whether the migrator's scanner 2002 is in the way of the command c, as shown at 2025. Stated differently, it may be determined whether the scanner's leading edge has reached the nodes associated with the command's arguments. For instance, if the scanner has not yet reached the nodes corresponding to the command's arguments, all of the (metadata of the) arguments of command c will be present only in the donor filesystem D, and none in the beneficiary filesystem B, as the scanner 2002 has not reached them yet. Therefore, the command may be executed at the donor filesystem D only, as the arguments of command c are not yet present in the beneficiary filesystem B. Similarly, if it is determined at 2024 that the trailing edge of the scanner is already past all of the arguments of command c 2022 (NO branch of 2025), the command c may also be executed, as suggested at 2026, as the arguments thereof are already present in both the donor and the beneficiary filesystems. The command c would then be applied to both the donor and the beneficiary filesystem.

When, however, the scanner 2002 is in the way of command c, meaning that some but not all of the arguments of command c are present in the donor filesystem only and one or more of the arguments thereof are in both the donor and beneficiary filesystems, the command c 2022 may not be executed immediately, as this would render the migrated portions of the donor and beneficiary filesystems dissimilar. Since, moreover, the present migration is intended to be carried out in one pass, merely saving such commands for later execution after all non-command-involved nodes have been migrated and thereafter returning to execute such commands is not optimal.

Therefore, one embodiment calls for temporarily blocking the execution of selected commands c as shown at 2028 and inserting them into a command queue 2030. In one embodiment, the command queue 2030 is or includes a priority queue, also known as a min heap. In this manner, the commands c whose arguments are likely to be migrated sooner are closer to the head of the queue than commands whose arguments are likely to be migrated later. Once a command has been blocked at 2028 and inserted into the min heap 2030, the execution thereof is postponed and the migration carries on in the same order as before, traversing the nodal tree of the donor filesystem D in the aforementioned DFS (for example) manner.

As noted above, once the metadata of data object O has been copied to the data repository 2008 at the beneficiary side, the migrator remote agent 2020 may so notify the scanner 2010, which causes the update progress module 2014 to update the position of the scanner 2010 in the donor filesystem D node traversal and allows the iterator 2012 to issue another getNext( ) command to continue the DFS traversal and the copying of at least the metadata of the data objects stored in the data repository 2006 at the donor side to the data repository 2008 at the beneficiary side. As the scanner 2002 processes the nodes and sends data objects to the migrator remote agent 2020 for copying to the beneficiary filesystem B, it is the update progress module 2014 that triggers a determination, at 2032, whether the scanner 2002 is in the way of the front of the min heap 2030.

Once the scanner 2002 has processed all of the nodes referencing data in the arguments of any blocked command, meaning that the arguments thereof are present in both the donor filesystem D and in the beneficiary filesystem B (meaning the migrator is no longer in the way of the front of the priority queue 2030—see NO branch of 2032), the command at the front of the min heap 2030 may be unblocked at 2034, dequeued and executed at both the donor filesystem D and in the beneficiary filesystem B, as suggested at 2026.

Coping with Adversarial Scenarios

Throughout the scan, it is desirable to assert that all nodes up to the trailing edge have been copied. However, it is impossible to maintain this assertion under the following exemplary adversarial scenarios:

1. If there is ingestion of new content, either new files or new content into existing files, at a rate that is faster than it is possible to transfer the ingested content, then this assertion cannot be maintained even if it becomes true temporarily during scanning.
2. Migration effort can also be thwarted even without ingesting any new content into the donor filesystem D. For instance, consider this snippet of code that executes repeated rename operations:

```
while ( true )
    rename a → x      //a in migrated, 2 x in unmigrated
    rename x → a
```

Figure 4:
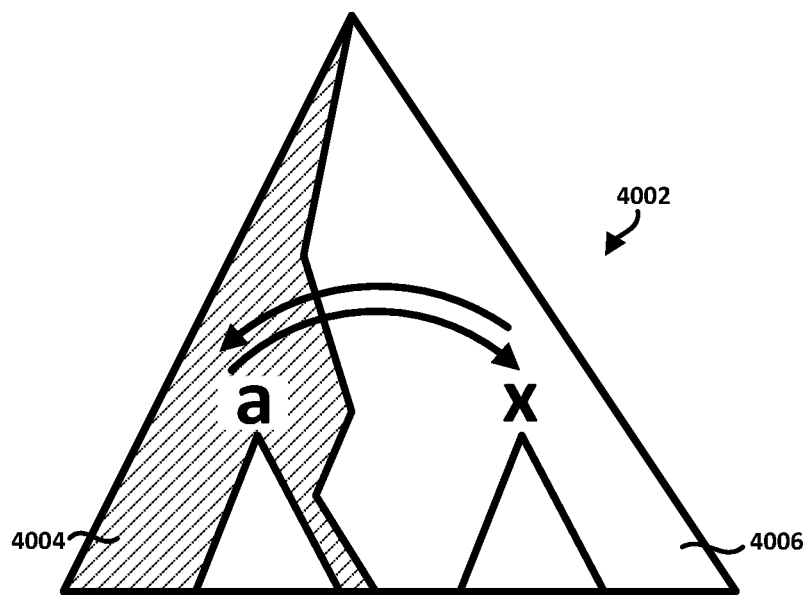
FIG. 4 is a diagram showing the manner in which repeated renames between the unmigrated and the migrated regions can stall migration.

FIG. 4 is a diagram showing the manner in which such repeated renames between the unmigrated and the migrated regions can stall migration. In FIG. 4, the outline of a rooted nodal tree is shown at 4002. The hashed portion thereof indicates the already migrated portion 4004 of the nodal tree, while the non-hashed white portion thereof indicates the as-yet unmigrated portion.

The difficulty involved in dealing with renames and repeated renames is ameliorated significantly by tracking the history of mutations a path has undergone. One possible method of tracking rename history, referred to by the name mapping service Application Program Interface MapFilename, is described and shown in commonly assigned U.S. patent application Ser. No. 15/457,837 filed on Mar. 13, 2017 and entitled "Methods, Devices and Systems for Maintaining Consistency of Metadata and Data across Data Centers", which is incorporated herein in its entirety. Other methods may be used.

For example, here is a different coping mechanism against the particular difficulty involving repeated directory renames of the type shown above. Recall that the leading edge refers to the last node for which the scanner 2002 issued a request for the content to be migrated and the trailing edge refers to the smallest (or leftmost) node for which the scanner issued a request, but the beneficiary has not acknowledged the successful writing of the metadata corresponding to that node. If one of the arguments of the rename is either the leading or the trailing edge or a node that is between these leading and trailing edges, then that rename command, according to one embodiment, is temporarily blocked until the scanner gets out the way. Also, unless some arguments to the rename command are in the migrated region and the others in the unmigrated region, the arguments of the rename command are handled as described above. That is, if all of the arguments of the rename command are already available in the beneficiary filesystem, B, the rename may be safely executed at both the donor filesystem D and the beneficiary filesystem B. Likewise, if none of the arguments of the rename command are available in the beneficiary filesystem, B, the rename may be safely executed at the donor filesystem D only. This leaves the following two cases to consider:

1. Migrated to Unmigrated Rename: One embodiment is to perform a rename locally followed by deleting the node at the remote end, although other implementations are possible. Indeed, performing a rename locally followed by deleting the node at the remote (i.e., executing the rename command locally, and deleting the corresponding object at the remote server), while correct, is less than optimally efficient. Assume the operation is rename s→t, where s and t are in migrated and unmigrated respectively. At the donor filesystem D, it makes no difference, but at the remote beneficiary filesystem B, deleting the subtree rooted at s only to recreate it at a later time under the name t in its entirety is wasteful. One option is to perform the operation at the donor filesystem D right away and schedule the remote operation at the beneficiary filesystem B to be dealt with for a later time, e.g. until after the scanner has had a chance to create the parent of t.

Figure 5:
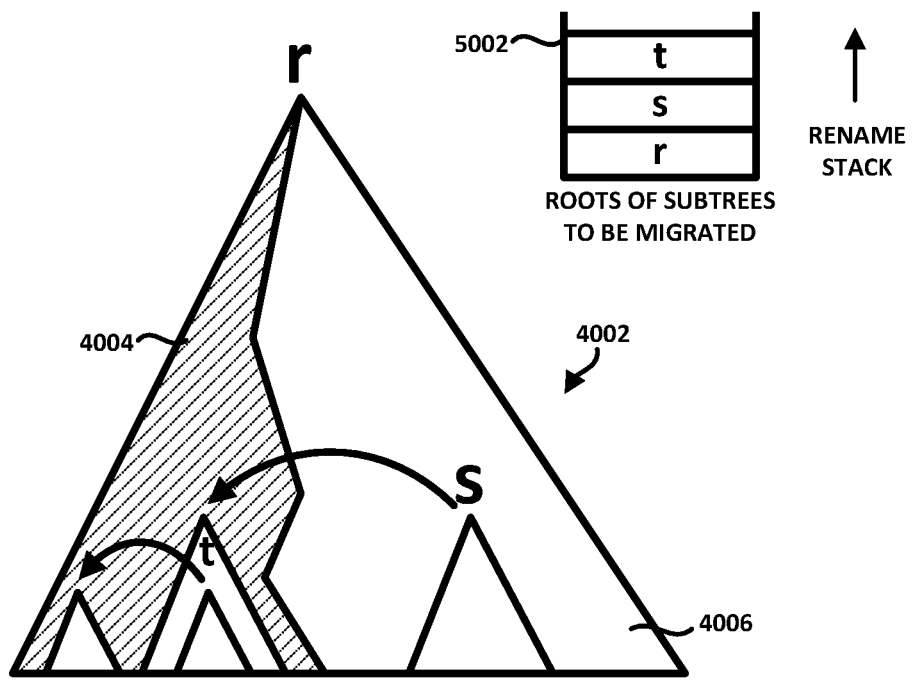
FIG. 5 is a diagram showing aspects of rename commands from an unmigrated portion of the beneficiary filesystem B to a migrated portion thereof.

2. Unmigrated to Migrated Rename: This case requires a more detailed explanation and it is handled as follows, with reference to FIG. 5. As the rename requests arrive, they are performed immediately at the donor and their roots are pushed onto a size-limited stack 5002, which operates to schedule the migrator to process designated as additional "unmigrated regions." In other words, these renames create "holes" in the contiguous migrated region, but because the size of the stack is upper-bounded by a predetermined constant, the number of holes is bounded at any given time. If the stack containing these additional migration becomes full, new rename requests of this kind may be rejected.

Tracking of Open Files

Commands issued against a filesystem have one or more arguments. These arguments are paths leading to a directory or a file in the filesystem. As noted in [0022] above, they can be compared using the <operator, which defines a total ordering of the set of all possible arguments.

In one embodiment, the set S of arguments of commands that have been allowed to execute, that operate on the unmigrated portion of the donor filesystem D, and that are not known to have terminated can be tracked to facilitate efficient migration of the filesystem. Hence, the set S can be stored in any data structure that supports efficient insertion and deletion of elements and an efficient way to find the least element, termed the fencepost F, shown in FIG. 1C. In FIG. 1A, the unmigrated nodes of the donor filesystem D are nodes 10, 11 and 12. As shown, a client is currently interacting with node 11, which node 11 is an argument of a command that has been allowed to execute, that operates on the unmigrated portion of the donor filesystem D, and that is not known to have terminated. Therefore, S={11} and node 11 is also the fencepost (the least or smallest element of S. To use another example, assume that there is client activity on node 12. Then, the set S as defined herein is {12}. Since S has only one element, the least (or minimum) element of the set S is node 12. While node 12 is still open, assume that another command is issued to open node 10. Then, the set S becomes {10, 12}. The fencepost now becomes node 10, because 10 is the least (smallest) element of S. Now, if node 10 finishes migrating before node 12, S goes back to the one-element set {12} and the fencepost F accordingly moves back to node 12. Note that the insertions and deletions of the elements of S may be in random order. The elements of S can be structured as a self-balancing binary search tree to efficiently support these operations, e.g. a min heap, or a red-black tree. (Ref: Cormen, Thomas H.; Leiserson, Charles E.; Rivest, Ronald L.; Stein, Clifford (2009) [1990]. Introduction to Algorithms (3rd ed.). MIT Press and McGraw-Hill. ISBN 0-262-03384-4), incorporated herein by reference in its entirety.

Figure 1C:
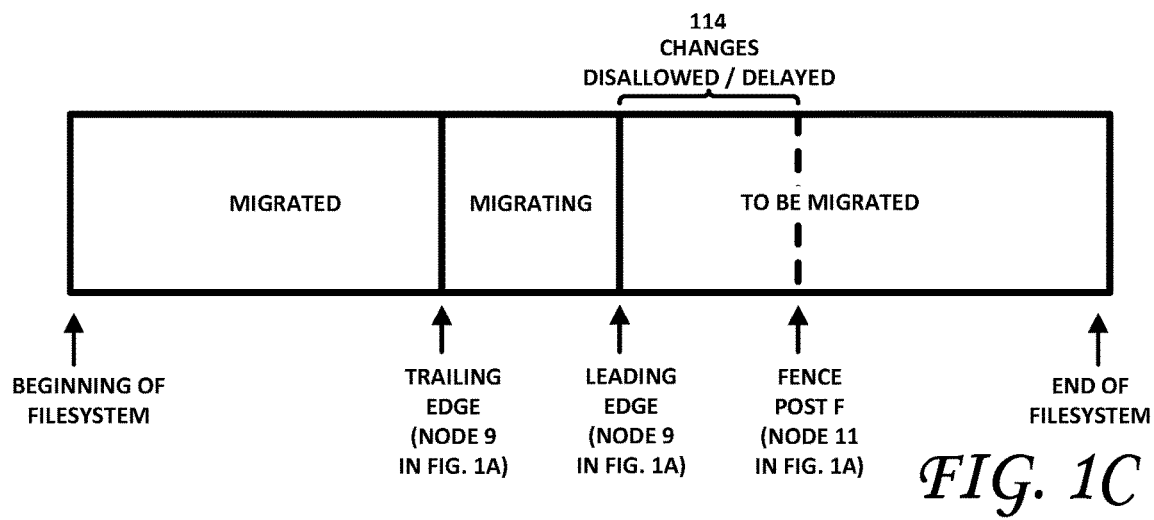
FIG. 1C is a diagram illustrating the fencepost F as content is being migrated from a donor filesystem D to a beneficiary filesystem B, according to one embodiment.

A sufficient condition to ensure the correctness of the migration is to synchronize the scanner 2002 with updates to S such that the scanner never overtakes F. Stated differently, the leading edge should not get past the fencepost. This may be achieved by disallowing changes that would move the fencepost as the scanner advances, i.e. disallow any command that has an argument that is <F and >, (greater-than-equal) leading edge, as indicated at 114 in FIG. 1C. In other words, delay any client activity that would take place between the leading edge and the fencepost at the beginning of the scan. Client requests that would result in a lower fencepost value are delayed until the scan is complete. According to one embodiment, once the scan is complete, delayed client requests are allowed to proceed, some of which will now be operating on the migrated portion of the filesystem. The rest that continue to need to operate on the unmigrated portion are added to S. Other ways to achieve may occur to one of skill in this art. Note that when S is empty, F is undefined. One way to ensure the correctness of the migration under this circumstance is to disallow any changes to the unmigrated portion of the filesystem while advancing the scanner 2002. Other ways to deal with this circumstance may also become apparent to one of skill in the art. FIG. 1C illustrates the usefulness of the notion of a fencepost.

In FIGS. 1A and 1C, the leading edge (which happens to be the trailing edge as well) is at node 9. In order to getNext( ) of the filesystem, the scanner only need to block (i.e., delay changes to) nodes 9, 10, and 11 (the actual leading edge and its children); node 12 can be operated upon by the client freely while the scanner is getting the next node to visit. Once the scanner 2002 has reached node 11, the fence post F may be moved to a higher-ranked (to the right) node accordingly.

Orphaned Iterator

Some client requests can interfere with the natural progression of the scanner 2002, make it lose its position within the filesystem and render it an orphan unless precautionary measures are taken. These include:

1. A request to delete a directory which is an ancestor of the leading edge
2. A request to move a directory which is an ancestor of the leading edge For example and with reference FIG. 1, if a rename 8→2 command is executed, getNext( ) would return an incorrect value when the iterator reaches the last descendant of 8, i.e. 12. Similarly, if delete x is executed where x is an ancestor of the scanner's current position, migrating the nodes under the subtree rooted x is pointless.

These kinds of issues can be addressed by recognizing the offending commands, meaning those that have one or more arguments that is or are an ancestor of the leading edge. Consider delete operations. For instance, according to one embodiment, a delete x command c may be executed by first running getNext( ) of x, using that as the node where the scanner should resume its operation, followed by deletion of x at both the donor filesystem D and at the beneficiary filesystem B. Rename commands, according to one embodiment, may also be reduced to some combination of renames from unmigrated to migrated, or vice versa depending on the target. For example, if the target of rename is in the migrated portion of the donor filesystem D, the target may be treated as if it were a rename from the unmigrated region to the migrated, as detailed above. Similarly, if the target is in the unmigrated region of the donor filesystem D, a rename may be carried out locally, followed by deleting the node at the remote node, or any optimizations thereof.

Migrator Initiation While the Donor Filesystem is Active

The migrator may be initiated at any time. That is, the donor filesystem D may be in a quiescent state, or may be currently active. If the donor filesystem is actively processing commands, one embodiment calls for setting a configurable amount of time t during which the migrator silently collects data on open files, without kicking off the scanner. During this time, the migrator would learn about the activity on the filesystem so that it can use this information during scanning. The assumption here is that files that need to be migrated would stay open for less than t units of time.

A more invasive approach is to use a proposal with an appropriate path such that all subsequent client activity is blocked until this proposal is handled. Eventually the filesystem reaches a quiescent state, at which time the migrator kicks off the scanner and unblocks the client activity that it might have blocked. One downside to using a proposal is that if there are long running operations, client activity gets blocked for an unreasonable amount of time. Therefore, this approach must be used with care.

Figure 6:
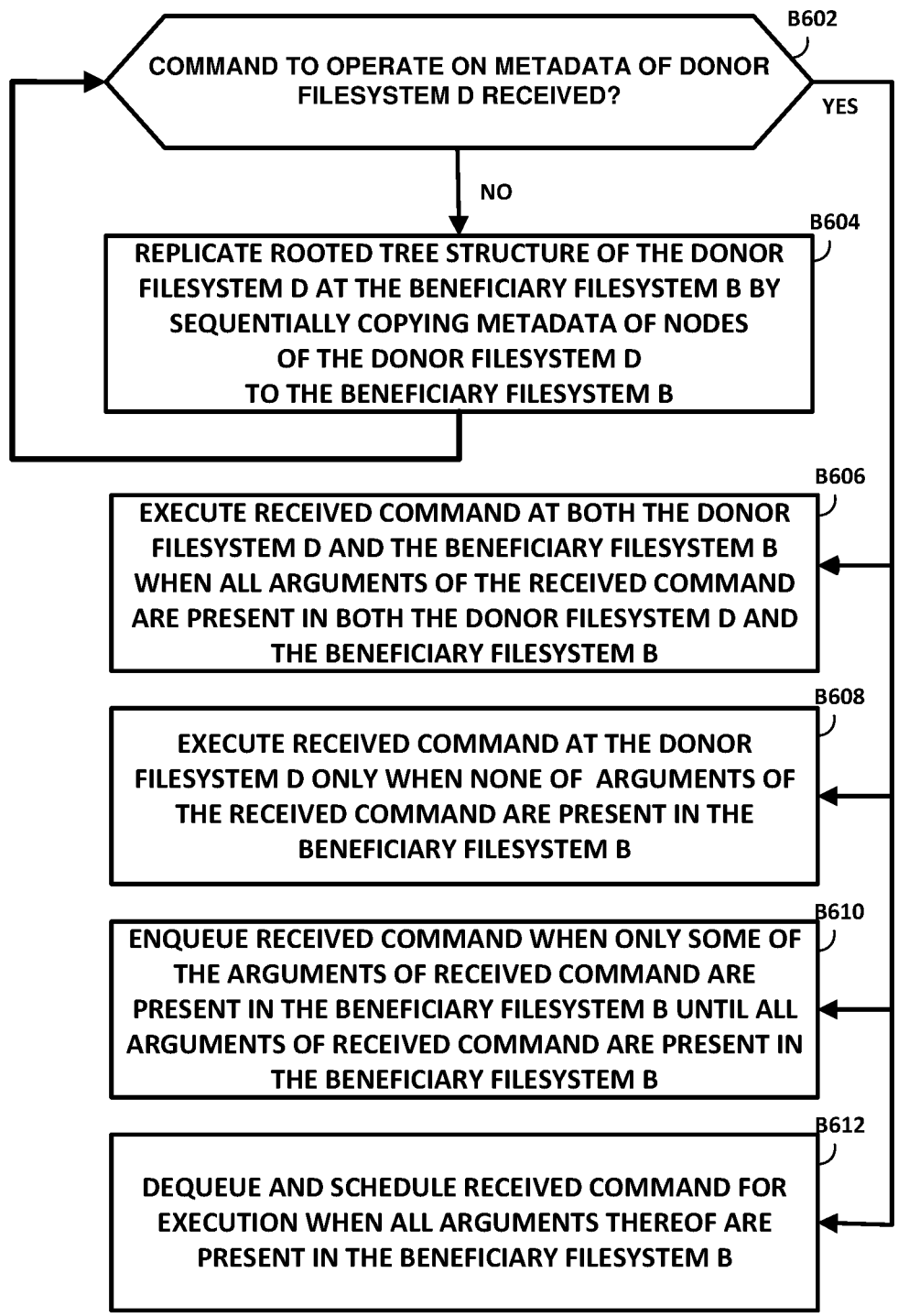
FIG. 6 is a flowchart of a computer-implemented method of migrating metadata from a donor filesystem D having a rooted tree structure to a beneficiary filesystem B while processing commands that operate on the metadata, according to one embodiment.

FIG. 6 is a flowchart of a computer-implemented method of migrating an active filesystem from a donor filesystem D to a beneficiary filesystem B, according to one embodiment. As shown therein, the computer-implemented method of migrating metadata from a donor filesystem D having a rooted tree structure to a beneficiary filesystem B while processing commands that operate on the metadata may comprise, as shown at block B602, determining whether a command has been received to operate on metadata of the donor filesystem D. If no such command is received, block B604 may be carried out, in which the rooted tree structure of the donor filesystem D may be replicated at the beneficiary filesystem B by sequentially copying metadata of nodes of the donor filesystem D to the beneficiary filesystem B.

When a command is received to operate on the metadata of the donor filesystem D, the received command may be executed at both the donor filesystem D and the beneficiary filesystem B when all arguments of the received command are present in both the donor filesystem D and the beneficiary filesystem B, as shown at B606. As shown at B608, when none of arguments of the received command are present in the beneficiary filesystem B, the received command may be executed at the donor filesystem D only.

As shown at B610, when only some of the arguments of the received command are present in the beneficiary filesystem B, the received command may be enqueued in a queue at least until all arguments of the received command are present in the beneficiary filesystem B. The received command may be dequeued and scheduled for execution when all arguments thereof are present in the beneficiary filesystem B, as shown at block B612.

According to one embodiment, the computer-implemented may further comprise dequeuing any remaining commands from the queue and scheduling the dequeued commands for execution when the rooted tree structure of the donor filesystem D has been replicated to the beneficiary filesystem B. The queue may be a priority queue such as a min heap. Replicating the rooted tree structure of donor filesystem D may comprise, for example, traversing and copying the rooted tree structure in a Depth First Scan (DFS) manner. When the command to operate on the metadata includes a delete operation of a node that is an ancestor of a leading edge of the replication of the rooted tree structure, the computer-implemented method may further comprise identifying a next node after the node that is to be deleted as the node where the sequential copying is to resume, executing the delete operation on both the donor filesystem D and the beneficiary filesystem B, and resuming sequential copying at the identified next node. When the command to operate on the metadata includes a rename operation of metadata that has already been copied from the donor filesystem D to the beneficiary filesystem B, the computer-implemented method may further comprise executing the rename operation as though it were a rename operation of metadata that has not already been copied from the donor filesystem D to the beneficiary filesystem B. Alternatively, when the command to operate on the metadata includes a rename operation of metadata that has not already been copied from the donor filesystem D to the beneficiary filesystem B, the computer-implemented method may further comprise executing the rename operation at the donor filesystem D, and deleting any nodes affected by the rename operation at the beneficiary filesystem B. The computer-implemented method may further comprise independently copying data blocks associated with the metadata from the donor filesystem D to the beneficiary filesystem B. The computer-implemented method may further comprise stepping though the rooted tree structure in a step-wise manner using a scanner process that fetches metadata of a next node of an unmigrated portion of the donor filesystem D and provides the fetched metadata to a remote agent at the beneficiary filesystem B that is configured to copy the provided metadata to the beneficiary filesystem B. Receiving a command to operate on the metadata may comprise intercepting the command from a sender thereof before the command is executed and operates to change metadata stored in the donor filesystem D. The computer-implemented method may also include dequeuing and scheduling for execution any remaining commands that are present in the queue after the rooted tree structure of the beneficiary filesystem B has been migrated to the beneficiary filesystem B. Migrating metadata from the donor filesystem D to the beneficiary filesystem B while processing commands that operate on the metadata may be, according to one embodiment, executed in one pass-through of the rooted tree structure of the beneficiary filesystem B. Enqueuing the received command comprises temporarily blocking an execution thereof. The computer-implemented method may further comprise receiving repeated rename commands and temporarily blocking execution of the repeated rename commands by pushing the repeated rename command onto a size-limited stack for later execution. When the copying of the metadata of nodes of the donor filesystem D to the beneficiary filesystem B encounters an open file, the method may further comprise temporarily blocking a portion of the rooted tree structure spanning from the open file down to hierarchically-lower portions of the rooted tree structure.

Another embodiment is a computer-implemented system comprising a donor filesystem D having a rooted tree structure; a beneficiary filesystem B; a migrator remote agent coupled to the beneficiary filesystem B and a migrator process configured to intercept commands issued by a sender to change metadata stored in the donor filesystem D, the migrator process comprising a scanner process configured to step through a rooted tree structure of the donor filesystem D, and sequentially send metadata retrieved therefrom to the migrator remote agent, over a computer network, for copying into the beneficiary filesystem B to replicate the donor filesystem D to the beneficiary filesystem B. The migrator process may be further configured to process the intercepted commands by executing the received command at both the donor filesystem D and the beneficiary filesystem B when all arguments of the intercepted command are present in both the donor filesystem D and the beneficiary filesystem B; executing the received command at the donor filesystem D only when none of arguments of the intercepted command are present in the beneficiary filesystem B; enqueueing the received command in a queue when only some of the arguments of the intercepted command are present in the beneficiary filesystem B at least until all arguments of the received command are present in the beneficiary filesystem B; and dequeuing and scheduling the intercepted command for execution when all arguments thereof are present in the beneficiary filesystem B.

Physical Hardware

Figure 7:
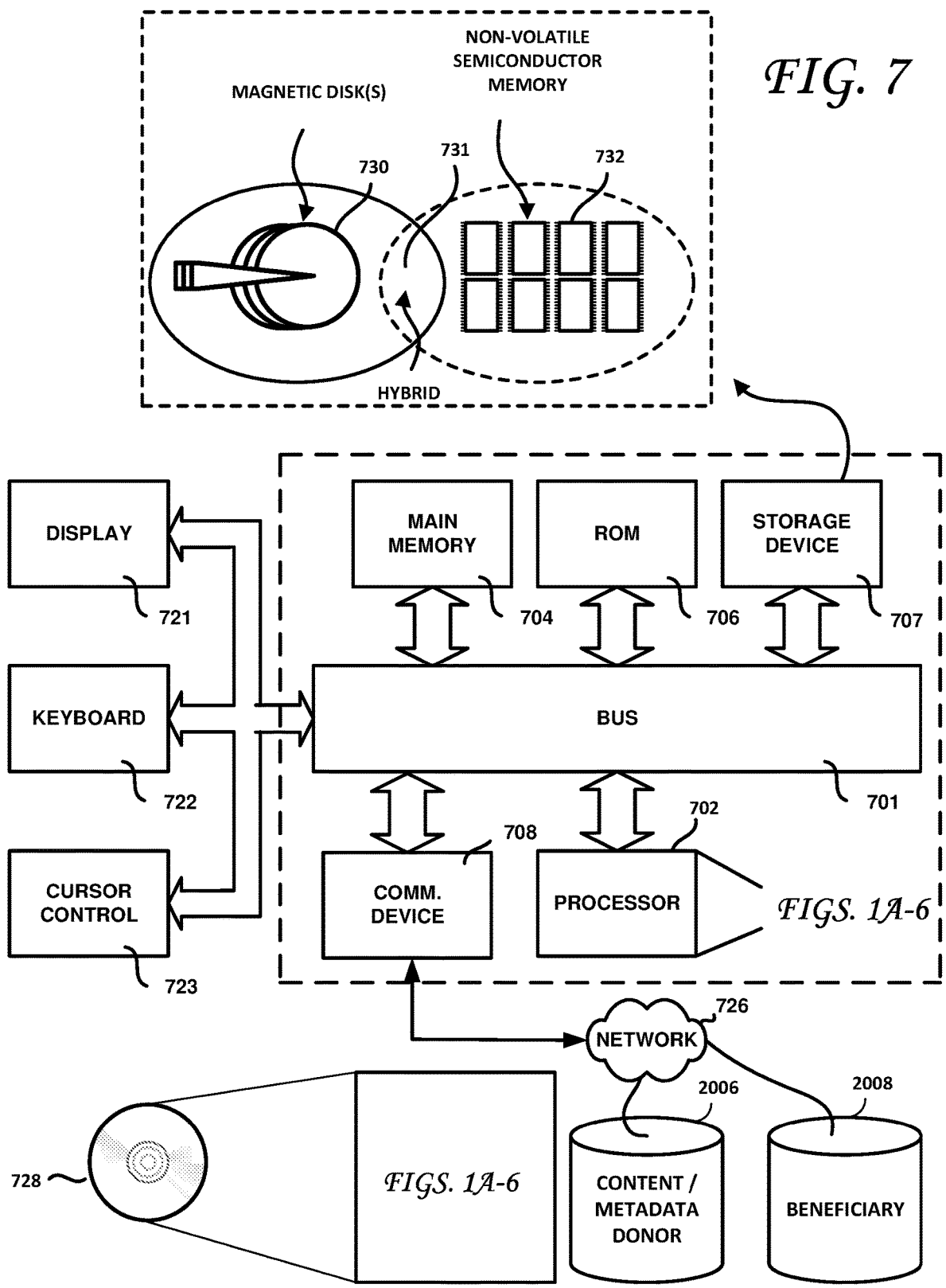
FIG. 7 shows physical hardware that may be used to implemented aspects of the present method of migrating metadata from a donor filesystem D having a rooted tree structure to a beneficiary filesystem B while processing commands that operate on the metadata, according to one embodiment.

FIG. 7 illustrates a block diagram of a computing device with which embodiments may be implemented. The computing device of FIG. 7 may include a bus 701 or other communication mechanism for communicating information, and one or more processors 702 coupled with bus 701 for processing information. The computing device may further comprise a random-access memory (RAM) or other dynamic storage device 704 (referred to as main memory), coupled to bus 701 for storing information and instructions to be executed by processor(s) 702. Main memory (tangible and non-transitory, which terms, herein, exclude signals per se and waveforms) 704 also may be used for storing temporary variables or other intermediate information during execution of instructions by processor 702. The computing device of FIG. 7 may also include a read only memory (ROM) and/or other static storage device 706 coupled to bus 701 for storing static information and instructions for processor(s) 702. A data storage device 707, such as a magnetic disk and/or solid-state data storage device may be coupled to bus 701 for storing information and instructions—such as would be required to carry out the functionality shown and disclosed relative to FIGS. 1-6. The computing device may also be coupled via the bus 701 to a display device 721 for displaying information to a computer user. An alphanumeric input device 722, including alphanumeric and other keys, may be coupled to bus 701 for communicating information and command selections to processor(s) 702. Another type of user input device is cursor control 723, such as a mouse, a trackball, or cursor direction keys for communicating direction information and command selections to processor(s) 702 and for controlling cursor movement on display 721. The computing device of FIG. 7 may be coupled, via a communication interface (e.g., modem, network interface card or NIC) 708 to the network 726.

As shown, the storage device 707 may include direct access data storage devices such as magnetic disks 730, non-volatile semiconductor memories (EEPROM, Flash, etc.) 732, a hybrid data storage device comprising both magnetic disks and non-volatile semiconductor memories, as suggested at 731. References 704, 706 and 707 are examples of tangible, non-transitory computer-readable media having data stored thereon representing sequences of instructions which, when executed by one or more computing devices, implement aspects of the embodiments described and shown herein. Some of these instructions may be stored locally in a client computing device, while others of these instructions may be stored (and/or executed) remotely and communicated to the client computing over the network 726. In other embodiments, all of these instructions may be stored locally in the client or other standalone computing device, while in still other embodiments, all of these instructions are stored and executed remotely (e.g., in one or more remote servers) and the results communicated to the client computing device. In yet another embodiment, the instructions (processing logic) may be stored on another form of a tangible, non-transitory computer readable medium, such as shown at 728. For example, reference 728 may be implemented as an optical (or some other storage technology) disk, which may constitute a suitable data carrier to load the instructions stored thereon onto one or more computing devices, thereby re-configuring the computing device(s) to one or more of the embodiments described and shown herein. In other implementations, reference 728 may be embodied as an encrypted solid-state drive. Other implementations are possible.

Embodiments of the present invention are related to the use of computing devices to replicate active filesystems. According to one embodiment, the methods, devices and systems described herein may be provided by one or more computing devices in response to processor(s) 702 executing sequences of instructions, embodying aspects of the computer-implemented methods shown and described herein, contained in memory 704. Such instructions may be read into memory 704 from another computer-readable medium, such as data storage device 707 or another (optical, magnetic, etc.) data carrier, such as shown at 728. Execution of the sequences of instructions contained in memory 704 causes processor(s) 702 to perform the steps and have the functionality described herein. In alternative embodiments, hard-wired circuitry may be used in place of or in combination with software instructions to implement the described embodiments. Thus, embodiments are not limited to any specific combination of hardware circuitry and software. Indeed, it should be understood by those skilled in the art that any suitable computer system may implement the functionality described herein. The computing devices may include one or a plurality of microprocessors working to perform the desired functions. In one embodiment, the instructions executed by the microprocessor or microprocessors are operable to cause the microprocessor(s) to perform the steps described herein. The instructions may be stored in any computer-readable medium. In one embodiment, they may be stored on a non-volatile semiconductor memory external to the microprocessor, or integrated with the microprocessor. In another embodiment, the instructions may be stored on a disk and read into a volatile semiconductor memory before execution by the microprocessor.

Portions of the detailed description above describe processes and symbolic representations of operations by computing devices that may include computer components, including a local processing unit, memory storage devices for the local processing unit, display devices, and input devices. Furthermore, such processes and operations may utilize computer components in a heterogeneous distributed computing environment including, for example, remote file servers, computer servers, and memory storage devices. These distributed computing components may be accessible to the local processing unit by a communication network.

The processes and operations performed by the computer include the manipulation of data bits by a local processing unit and/or remote server and the maintenance of these bits within data structures resident in one or more of the local or remote memory storage devices. These data structures impose a physical organization upon the collection of data bits stored within a memory storage device and represent electromagnetic spectrum elements. Moreover, the computer-implemented methods disclosed herein improve the functioning of computers by enabling the migration of filesystems from a donor filesystem to a beneficiary filesystem while commands are issued and executed to change the metadata and data thereof. Such computer-implemented methods are not capable of being effectively carried out by the mental processes of humans.

A process, such as the computer-implemented methods described and shown herein, may generally be defined as being a sequence of computer-executed steps leading to a desired result. These steps generally require physical manipulations of physical quantities. Usually, though not necessarily, these quantities may take the form of electrical, magnetic, or optical signals capable of being stored, transferred, combined, compared, or otherwise manipulated. It is conventional for those skilled in the art to refer to these signals as bits or bytes (when they have binary logic levels), pixel values, works, values, elements, symbols, characters, terms, numbers, points, records, objects, images, files, directories, subdirectories, or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, positioning, placing, illuminating, removing, altering and the like. The operations described herein are machine operations performed in conjunction with various input provided by a human or artificial intelligence agent operator or user that interacts with the computer. The machines used for performing the operations described herein include local or remote general-purpose digital computers or other similar computing devices.

In addition, it should be understood that the programs, processes, methods, etc. described herein are not related or limited to any particular computer or apparatus nor are they related or limited to any particular communication network architecture. Rather, various types of general-purpose hardware machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

While certain example embodiments have been described, these embodiments have been presented by way of example only, and are not intended to limit the scope of the embodiments disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A computer-implemented method of migrating metadata from a donor filesystem having a rooted tree structure to a beneficiary filesystem while processing commands that operate on the metadata, comprising:
while a command to operate on the metadata is not received, replicating, by a computer system, the rooted tree structure of the donor filesystem at the beneficiary filesystem by sequentially copying metadata of nodes of the donor filesystem to the beneficiary filesystem;
receiving, by the computer system, a command to operate on the metadata;
delaying execution of the received command when fewer than all of the arguments of the received command are present in the beneficiary filesystem at least until all arguments of the received command are present in the beneficiary filesystem; and
scheduling the delayed command for execution the beneficiary filesystem when all arguments of the delayed command are present in the beneficiary filesystem.

2. The computer-implemented method of claim 1, further comprising executing, by the computer system, the received command at both the donor filesystem and the beneficiary filesystem when all arguments of the received command are present in both the donor filesystem and the beneficiary filesystem.

3. The computer-implemented method of claim 1, further comprising executing, by the computer system, the received command at the donor filesystem only when all arguments of the received command are present in the donor file system and none of the arguments of the received command are present in the beneficiary filesystem.

4. The computer-implemented method of claim 1, wherein delaying comprises:
enqueueing, by the computer system, the received command in a queue when only some of the arguments of the received command are present in the beneficiary filesystem B at least until all arguments of the received command are present in the beneficiary filesystem B; and
dequeuing and scheduling, by the computer system, the received command for execution when all arguments thereof are present in the beneficiary filesystem B.

5. The computer-implemented method of claim 4, further comprising dequeuing any remaining commands from the queue and scheduling dequeued commands for execution when the rooted tree structure of the donor filesystem has been replicated to the beneficiary filesystem.

6. The computer-implemented method of claim 4, wherein the queue is a min heap.

7. The computer-implemented method of claim 4, further comprising dequeuing and scheduling for execution any remaining commands that are present in the queue after the rooted tree structure of the donor filesystem has been migrated to the beneficiary filesystem.

8. The computer-implemented method of claim 4, wherein enqueuing the received command comprises temporarily blocking an execution thereof.

9. The computer-implemented method of claim 1, wherein replicating the rooted tree structure of donor filesystem comprises traversing and copying the rooted tree structure in a Depth First Scan (DFS) manner.

10. The computer-implemented method of claim 1, wherein when the command to operate on the metadata includes a delete operation of a node that is an ancestor of a leading edge of the replication of the rooted tree structure, the computer-implemented method further comprises identifying a next node after the node that is to be deleted as the node where the sequential copying is to resume, executing the delete operation on both the donor filesystem and the beneficiary filesystem, and resuming sequential copying at the identified next node.

11. The computer-implemented method of claim 1, wherein when the command to operate on the metadata includes a rename operation of metadata that has already been copied from the donor filesystem to the beneficiary filesystem, and wherein the computer-implemented method further comprises executing the rename operation as though the rename operation were a rename operation of metadata that has not already been copied from the donor filesystem to the beneficiary filesystem.

12. The computer-implemented method of claim 1, wherein when the command to operate on the metadata includes a rename operation of metadata that has not already been copied from the donor filesystem to the beneficiary filesystem, the computer-implemented method further comprises executing the rename operation at the donor filesystem, and deleting any nodes affected by the rename operation at the beneficiary filesystem.

13. The computer-implemented method of claim 1, further comprising independently copying data blocks associated with the metadata from the donor filesystem to the beneficiary filesystem.

14. The computer-implemented method of claim 1, further comprising:
stepping though the rooted tree structure in a step-wise manner using a scanner process that fetches metadata of a next node of an unmigrated portion of the donor filesystem and that provides the fetched metadata to a remote agent at the beneficiary filesystem that is configured to copy the provided metadata to the beneficiary filesystem.

15. The computer-implemented method of claim 14, further comprising preventing the scanner from fetching metadata of the next node of the unmigrated portion of the donor filesystem if fetching metadata of a next node of the unmigrated portion of the donor filesystem would overtake a least element of a set S of nodes of the rooted tree structure that are arguments of commands that have been allowed to execute, that operate on the unmigrated portion of the donor filesystem, and that are not known to have terminated.

16. The computer-implemented method of claim 14, further comprising disallowing a leading edge node that is a last node of the rooted tree structure whose metadata was fetched from overtaking a least element of a set S of nodes of the rooted tree structure that are arguments of commands that have been allowed to execute, that operate on the unmigrated portion of the donor filesystem, and that are not known to have terminated.

17. The computer-implemented method of claim 1, wherein receiving a command to operate on the metadata comprises intercepting the command from a sender of the command before the command is executed and operates to change metadata stored in the donor filesystem.

18. The computer-implemented method of claim 1, wherein migrating metadata from the donor filesystem to the beneficiary filesystem while processing commands that operate on the metadata is executed in one pass-through of the rooted tree structure of the donor filesystem.

19. The computer-implemented method of claim 1, further comprising receiving repeated rename commands and temporarily blocking execution of the repeated rename commands by pushing the repeated rename commands onto a size-limited stack for later execution.

20. The computer-implemented method of claim 1, wherein when the copying of the metadata of nodes of the donor filesystem to the beneficiary filesystem encounters an open file, the method further comprises temporarily blocking a portion of the rooted tree structure spanning from the open file down to hierarchically-lower portions of the rooted tree structure.

21. The computer-implemented method of claim 1, wherein sequentially copying comprises copying metadata of a sliding window encompassing at least one node and bounded by a leading edge node that is a last node whose metadata was fetched for copying and a trailing edge node that is a smallest node for which a request for metadata has been issued and for which the beneficiary filesystem has not yet acknowledged a successful writing thereof.

22. The computer-implemented method of claim 21, further comprising moving the sliding window to fetch additional metadata from the donor filesystem as acknowledgments of successful writing are received from the beneficiary filesystem and as the last node of the donor filesystem whose metadata is fetched is updated.

23. The computer-implemented method of claim 21, wherein a number of nodes of the donor filesystem within the sliding window grows as requests for metadata are issued to the donor filesystem and shrinks as acknowledgements of successful writing of the metadata are received from the beneficiary filesystem.

* * * * *